United States Patent [19]

Sides

[11] Patent Number: 4,813,374
[45] Date of Patent: Mar. 21, 1989

[54] PREPACKAGED LINER AND LITTER ASSEMBLY

[75] Inventor: Claude R. Sides, St. Louis, Mo.

[73] Assignee: Aragon Companies Inc., St. Louis, Mo.

[21] Appl. No.: 92,596

[22] Filed: Sep. 3, 1987

[51] Int. Cl.$^4$ .............................................. A01K 29/00
[52] U.S. Cl. .......................................................... 119/1
[58] Field of Search ............................................. 119/1

[56] References Cited

U.S. PATENT DOCUMENTS

| | | | |
|---|---|---|---|
| 3,286,826 | 11/1966 | Stoll | 119/1 X |
| 3,786,780 | 1/1974 | Pezzino | 119/1 X |
| 4,171,680 | 10/1979 | Silver et al. | 119/1 |
| 4,312,295 | 1/1982 | Harrington | 119/1 |
| 4,724,955 | 2/1988 | Martin et al. | 119/1 X |

Primary Examiner—Gene Mancene
Assistant Examiner—Michael Lynch
Attorney, Agent, or Firm—Rogers, Howell, Moore & Haferkamp

[57] ABSTRACT

A prepackaged liner and litter assembly for animal waste includes a bag with a plurality of liner and litter units within the bag. Each liner and litter unit includes a liner of flexible material with litter contained therein. Within the bag each liner is configured in pouch configuration to facilitate holding the litter therein, and each liner is adapted to being opened at the top and arranged within a litter box to extend over the bottom and sides of the box. The liner and litter units are arranged within the bag with the tops of the liners toward the top of the bag.

7 Claims, 1 Drawing Sheet

PREPACKAGED LINER AND LITTER ASSEMBLY

BACKGROUND AND SUMMARY OF THE INVENTION

This invention relates to a prepackaged liner and litter assembly for pet litter boxes.

Animal litter boxes are typically relatively shallow pans into which litter is placed. The boxes may be reusable or disposable as disclosed in U.S. Pat. Nos. 4,441,451 and 4,646,685 and British patent No. 1,023,162. It is also known to provide disposable liners for the boxes as disclosed in U.S. Pat. Nos. 3,227,137 and 4,279,217.

Typically, litter is placed in bags and transferred such as by pouring from the bag to the litter box. When the litter becomes soiled and needs replacing, and where a liner is used, the liner containing the soiled litter is removed and discarded and a new liner and fresh litter are then placed in the box.

Disposable boxes and liners are convenient in that they reduce the need to clean the box but still require that a quantity of litter be transferred to the box from a bulk supply. Also, the liners and litter are supplied separately which is inconvenient and requires that a separate supply of these items be maintained. The present invention overcomes these inconveniences.

In accordance with the present invention there is provided a prepackaged liner and litter assembly generally comprising a plurality of liner and litter units contained within a single bag with each having a liner containing a quantity of litter. Each liner has a hem about its periphery with a drawstring therein to close the liner. As packaged within the bag the liners are in a closed pouch configuration in a generally upright position and stacked with one on top of the other. In their open configurations the liners are large enough to cover the interior of a litter box while also having an outer portion that extends over the sides to fully protect the interior of the box from soiled litter and prevent litter from locating between the liner and box. A sufficient quantity of litter is contained in each prepackaged liner to spread over the bottom of the lined box. The liners preferably are made of plastic and provide a moisture barrier between the litter and box.

To use the assembly of the present invention the top liner and litter unit is removed from the bag by grasping the drawstring. As the unit is lifted from the bag the weight of the litter within the liner causes the liner to assume a pouch shape. When the pouch is placed in the litter box, the litter spreads somewhat under its own weight which flattens the bottom of the pouch to at least partially spread the liner over the bottom of the box. Then the top of the liner is opened and the liner arranged to extend over the entire bottom with the outer portions of the liner extending over the sides of the box. The litter is then further spread generally evenly over the bottom. To discard soiled litter, the liner is closed with the drawstring to its pouch configuration trapping the soiled litter therein. The pouch may be carried by the drawstring for discarding.

Hence, the present invention eliminates the inconvenience of purchasing and maintaining a supply of separate litter and liners, and eliminates the need to transfer litter from a bulk supply to the litter box and the mess and inconvenience associated therewith.

These and other advantages of the invention are apparent from the detailed description to follow.

DETAILED DESCRIPTION OF THE PREFERRED EMBODIMENT

Figure 1:
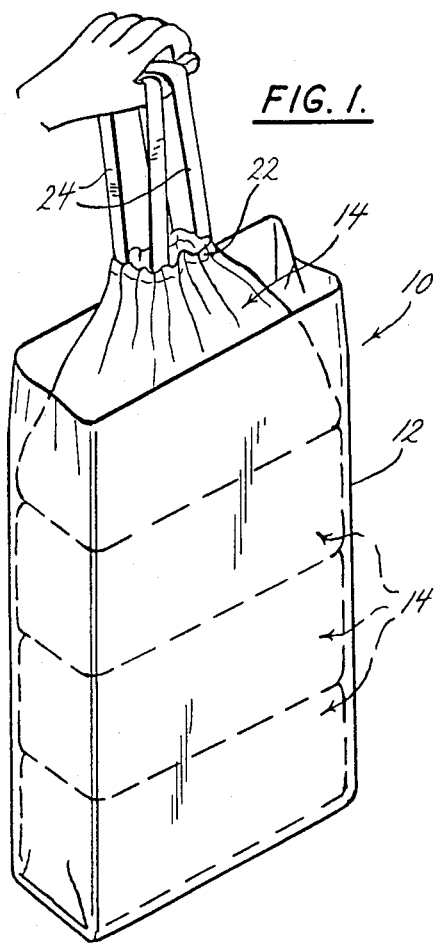
FIG. 1 is a perspective view of a prepackaged liner and litter assembly of the present invention.

FIG. 1 illustrates a prepackaged liner and litter assembly 10 of the present invention including a bag 12 and a plurality of liner and litter units 14 each including a liner 16 and litter 18 for use with a litter box 20. As packaged within the bag, the units are stacked one on top of the other in pouch configurations as shown and with the tops of the pouches directed generally upwardly.

Figure 2:
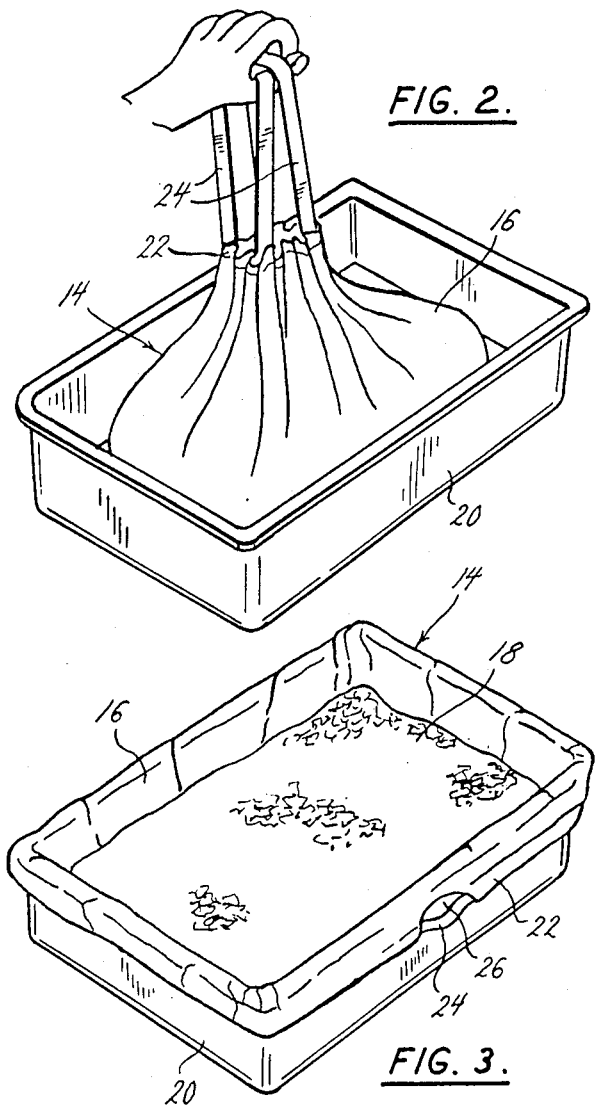
FIG. 2 is a perspective view showing one of the liner and litter units included in the assembly being placed in a litter box.
Figure 3:
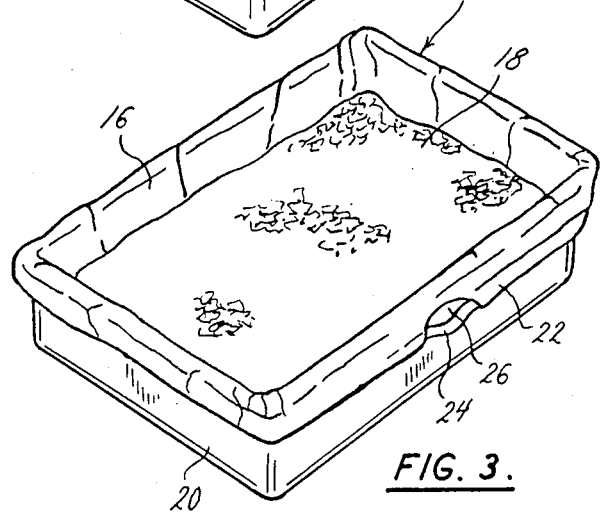
FIG. 3 is a perspective view of the liner and litter unit of FIG. 1 after being arranged to cover the box.
Figure 4:
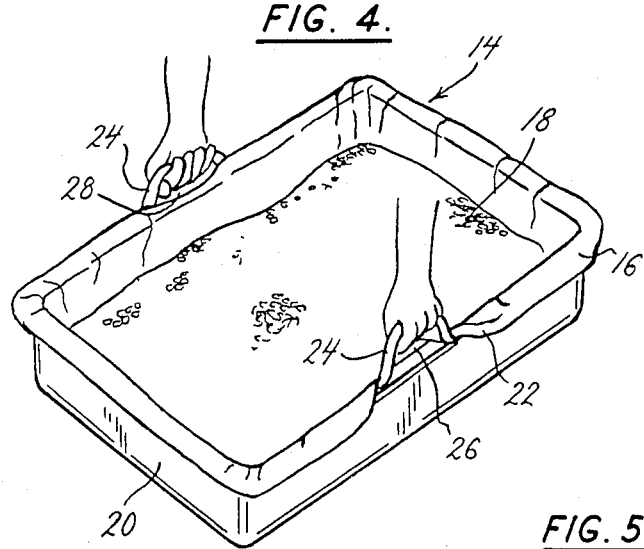
FIG. 4 is a perspective view showing the removal of the liner and litter unit from the box.
Figure 5:
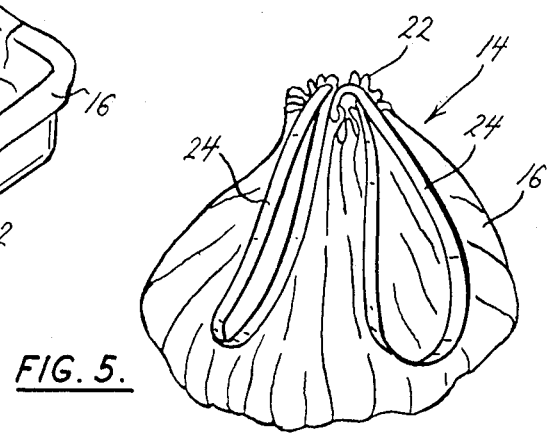
FIG. 5 is a perspective view of the liner and litter unit after it has been removed from the box for disposal.

The liners are constructed of a flexible plastic material which functions to contain the litter and keep the litter box clean, and which is capable of forming into the generally pouch like configuration as shown in FIGS. 1, 2, and 5, or in an open expanded configuration to cover the litter box as shown in FIGS. 3 and 4.

A hem 22 is formed in the periphery of the liner for holding a drawstring 24. The liner also has a pair of diametrically opposed openings 26 and 28 near the periphery and adjacent the drawstring which expose sections of the drawstring. The liner is closed to its pouch configuration by grasping the drawstring at the exposed sections and lifting the liner against the weight of the litter thereby causing the periphery of the liner to gather at the top as shown in FIGS. 1, 2 and 5.

It can be seen from the foregoing that the pre-packaged liner and litter assembly of the present invention provides significant advantages in convenience. The plurality of liners, each containing litter, are pre-packaged in a single bag which is conveniently purchased. To line and fill the litter box, the top liner and litter unit is removed from the bag by grasping the drawstring 24 as shown in FIG. 1 and lifting it from the bag, whereupon the weight of the litter in the liner causes the liner to assume a pouch configuration and causes the top of the pouch to close under the tension in the drawstring. The pouch is placed in the litter box as shown in FIG. 2 whereupon the litter spreads and the tension in the drawstring is released. The top or periphery of the liner is then opened and the liner is arranged to spread over the bottom and sides of the box as shown in FIG. 3. The litter is further spread generally evenly over the bottom of the box for use by the pet.

When the litter becomes soiled the liner and litter unit is discarded by grasping the drawstring at the openings 26 and 28 and lifting the unit as shown in FIG. 4. As the liner and soiled litter are lifted from the box, the liner again assumes a pouch configuration as shown in FIG. 5 with the weight of the litter causing the top of the pouch to close under the tension in the drawstring. The drawstring may be tied in a knot to further secure the top opening. The disposable liner and soiled litter may now be easily and neatly discarded. The disposable plastic liner keeps the box clean so it is ready for the next liner and litter unit from the bag.

While a non elastic drawstring is shown, it is to be understood that the drawstring may be elastic. With an elastic drawstring the liner and litter unit is opened by stretching the drawstring and closed by releasing it. To line and fill the litter box, after the unit is placed in the box, the top of the unit is stretched open and over the sides of the box and the drawstring released such that the periphery of the liner is held against the outer surface of the box.

There are various changes and modifications which may be made to the invention as may be apparent to those skilled in the art. However, these changes or modifications are included in the teaching of the disclosure, and it is intended that the invention be limited only by the scope of the claims appended hereto.

What is claimed is:

1. A prepackaged liner and litter assembly for animal waste comprising:
   a bag;
   a plurality of liner and litter units within said bag;
   each unit further comprising a liner with litter in each liner for use in conjunction with a pre-existing litter box;
   each liner having means for configuring said liner in a pouch configuration to facilitate holding the litter therein, each liner adapted to being opened at the top and arranged within the litter box with the litter at the bottom of the box and outer portions of the liner overlying the sides of the box; and
   the liners being oriented within the bag with the tops of the liners toward the top of the bag.

2. The assembly of claim 1 wherein each liner has a hem formed in its periphery, and a drawstring in the hem for closing the liner.

3. The assembly of claim 2 wherein each liner has openings near its periphery adjacent the drawstring to facilitate grasping the drawstring.

4. The assembly of claim 1 wherein the liner is made of plastic.

5. The assembly of claim 1 wherein the liner and litter units are stacked one on top of the other in the bag.

6. The assembly of claim 1 wherein the liner and litter units within the bag are in a pouch configuration.

7. The assembly of claim 1 wherein each liner is of a flexible material.

* * * * *